United States Patent
Wang et al.

(10) Patent No.: US 10,847,813 B2
(45) Date of Patent: Nov. 24, 2020

(54) FLOW FIELDS FOR ELECTROCHEMICAL CELL

(71) Applicant: HYDROGENICS CORPORATION, Mississauga (CA)

(72) Inventors: Rainey Yu Wang, Richmond Hill (CA); Rami Michel Abouatallah, Toronto (CA); Nathaniel Ian Joos, Toronto (CA)

(73) Assignee: HYDROGENICS CORPORATION, Mississauga (CA)

( * ) Notice: Subject to any disclaimer, the term of this patent is extended or adjusted under 35 U.S.C. 154(b) by 0 days.

(21) Appl. No.: 16/198,832

(22) Filed: Nov. 22, 2018

(65) Prior Publication Data

US 2019/0097245 A1 Mar. 28, 2019

Related U.S. Application Data

(62) Division of application No. 15/353,162, filed on Nov. 16, 2016, now Pat. No. 10,193,164.

(60) Provisional application No. 62/256,320, filed on Nov. 17, 2015.

(51) Int. Cl.
*H01M 8/0258* (2016.01)
*C25B 1/12* (2006.01)
*C25B 9/08* (2006.01)

(52) U.S. Cl.
CPC ............. *H01M 8/0258* (2013.01); *C25B 1/12* (2013.01); *C25B 9/08* (2013.01)

(58) Field of Classification Search
None
See application file for complete search history.

(56) References Cited

U.S. PATENT DOCUMENTS

| | | | |
|---|---|---|---|
| 5,683,828 A | 11/1997 | Spear et al. | |
| 5,840,438 A | 11/1998 | Johnson et al. | |
| 6,051,331 A | 4/2000 | Spear, Jr. et al. | |
| 6,566,001 B2* | 5/2003 | Yosida | H01M 8/0263 429/413 |
| 8,986,905 B2 | 3/2015 | McElroy et al. | |

(Continued)

FOREIGN PATENT DOCUMENTS

| | | |
|---|---|---|
| CA | 2522731 A1 | 11/2004 |
| CN | 1184559 A | 6/1998 |

(Continued)

OTHER PUBLICATIONS

European Patent Application No. EP16865347.5, Communication pursuant to Article 70(2) and 70a(2) EPC dated Jul. 19, 2019.

(Continued)

*Primary Examiner* — Wyatt P McConnell

(57) ABSTRACT

An electrochemical cell has first and second flow fields on opposite sides of a membrane. The first flow field has a set of generally linear channels in which the flow of a fluid in the field is contained between parallel elongate ridges. The second flow field is defined by a set of parallel discontinuous ridges. Preferably most ridge segments in the second flow field are oblique, for example perpendicular, to and overlap with two or more ridges of the first flow field. The flow fields may be used in, for example, water electrolysis cells including high or differential pressure polymer electrolyte membrane (PEM) electrolysis cells.

16 Claims, 3 Drawing Sheets

(56) References Cited

U.S. PATENT DOCUMENTS

| | | | |
|---|---|---|---|
| 2001/0005557 A1 | 6/2001 | Yosida et al. |
| 2001/0041281 A1 | 11/2001 | Wilkinson et al. |
| 2005/0064263 A1 | 3/2005 | Goebel et al. |
| 2006/0210855 A1 | 9/2006 | Frank et al. |

FOREIGN PATENT DOCUMENTS

| | | |
|---|---|---|
| CN | 1643718 A | 7/2005 |
| CN | 1663067 A | 8/2005 |
| CN | 1845368 A | 10/2006 |
| CN | 201083600 Y | 7/2008 |
| CN | 104134807 A | 11/2014 |
| WO | 2014206237 A1 | 12/2014 |

OTHER PUBLICATIONS

European Patent Application No. EP16865347.5, Extended European Search Report dated Jul. 2, 2019.
International Patent Application No. PCT/CA2016/051335, International Preliminary Report on Patentability, dated May 31, 2018.
International Patent Application No. PCT/CA2016/051335, International Search Report and Written Opinion dated Jan. 11, 2017.
U.S. Appl. No. 15/353,162, Notice of Allowance dated Sep. 6, 2018.
U.S. Appl. No. 15/353,162, Non-Final Office Action dated Apr. 17, 2018.
U.S. Appl. No. 15/353,162, Non-Final Office dated Sep. 12, 2017.
Chinese Patent Application No. 201680067202.5, First Office Action dated Sep. 4, 2019.
Chinese Patent Application No. 201680067202.5, Office Action dated Mar. 19, 2020.
Chinese Patent Application No. CN20168067202, Decision of Rejection dated Aug. 3, 2020.

\* cited by examiner

FLOW FIELDS FOR ELECTROCHEMICAL CELL

RELATED APPLICATIONS

This application is a division of U.S. application Ser. No. 15/353,162, filed Nov. 16, 2016, which claims priority from, or the benefit of, U.S. provisional application No. 62/256,320, filed Nov. 17, 2015. U.S. provisional application No. 62/256,320 is incorporated herein by reference.

FIELD

The specification relates to electrochemical cells, and in particular to the design of a flow field plate or plates.

BACKGROUND

Canadian Patent 2522731 shows various designs for flow field plates suited for use in electrochemical cells. In some cases, a bipolar plate is provided. In some embodiments, active surfaces corresponding to an anode and a cathode are substantially identical to one another whereas in other embodiments the respective active surfaces are identical to one another after a transformation such as a reflection or 180 degree rotation.

INTRODUCTION

This specification describes the design of corresponding flow fields or flow field plates, the flow fields corresponding in the sense that they are located on opposite sides of a membrane in an electrochemical cell. The word "plates" will be used herein to indicate any of two separate plates; a single plate, such as a bipolar plate, having a flow field on both of its sides; and, a pair of bipolar plates.

A first flow field has a set of channels in which the flow of a fluid in the field is generally confined to distinct linear paths between an inlet and an outlet. Optionally, the channels may branch near the inlet and merge near the outlet. However, most, i.e. 50% or more but optionally 80% or more, of the area of the first flow field is made up of channels defined by long ridges. At least some of the long ridges may extend, optionally with one or more bends, across most of the straight-line distance between the inlet and outlet. The length of the ridges (which may include one or more bends) relative to the width of the channels is in a ratio of at least 10:1 or 20:1.

The second flow field is comparatively less directional, with shorter ridges and more potential mixing between flow paths. For example, the length of the ridges relative to the width of the channels may be in a ratio of less than 10:1 over most, i.e. 50% or more but optionally 80% or more, of the area of the second flow field. The second flow field has at least one outlet and might, or might not, also have one or more inlets. Preferably, most of the ridges in the second flow field are oblique to, for example generally perpendicular to, ridges in the first flow field. Preferably, the ridges in the second flow field form a set of parallel segmented lines, with the segments offset from each other in successive lines, for example such that gaps between ridges in one line are located across from ridges in adjacent lines. Most of the ridges in the second flow field overlap with at least two ridges of the first flow field.

This specification also describes a method of laying out the second flow field. In the method, notional ridges of the second flow field are laid out perpendicularly to ridges in the first flow field, on top of ridges in the flow field, or in a combination of these positions, but preferably mostly perpendicular to ridges in the first flow field. The notional ridges in the second flow field are then broken into segments. Where the segments are perpendicular to ridges in the first flow field, the segments span between pairs of ridges of the first flow field. Optionally, where the direction of the ridges in the second flow field changes, there may be bent ridges. Since the second flow field is generally non-directional, an outlet, or inlet if any, may be located within or in communication with any side of the second flow field.

Compared to a second flow field that matches the first flow field, the arrangement of the second flow field can provide a fluid pathway independent of the direction of fluid flow in the first flow field. The arrangement is useful, for example, in any electrochemical cell, such as a water electrolyzer wherein the first flow field may carry a liquid, the second flow field may carry a gas, and it is desirable to be able to design the liquid flow field with minimal constraints provided by the gas flow field. Where most of the ridges in the second flow field span between ridges in the first flow field, the arrangement can also help the membrane withstand transmembrane pressure differential reversals or fluctuations, for example as may occur while starting up or shutting down a differential pressure water electrolyzer.

DETAILED DESCRIPTION

Figure 1:
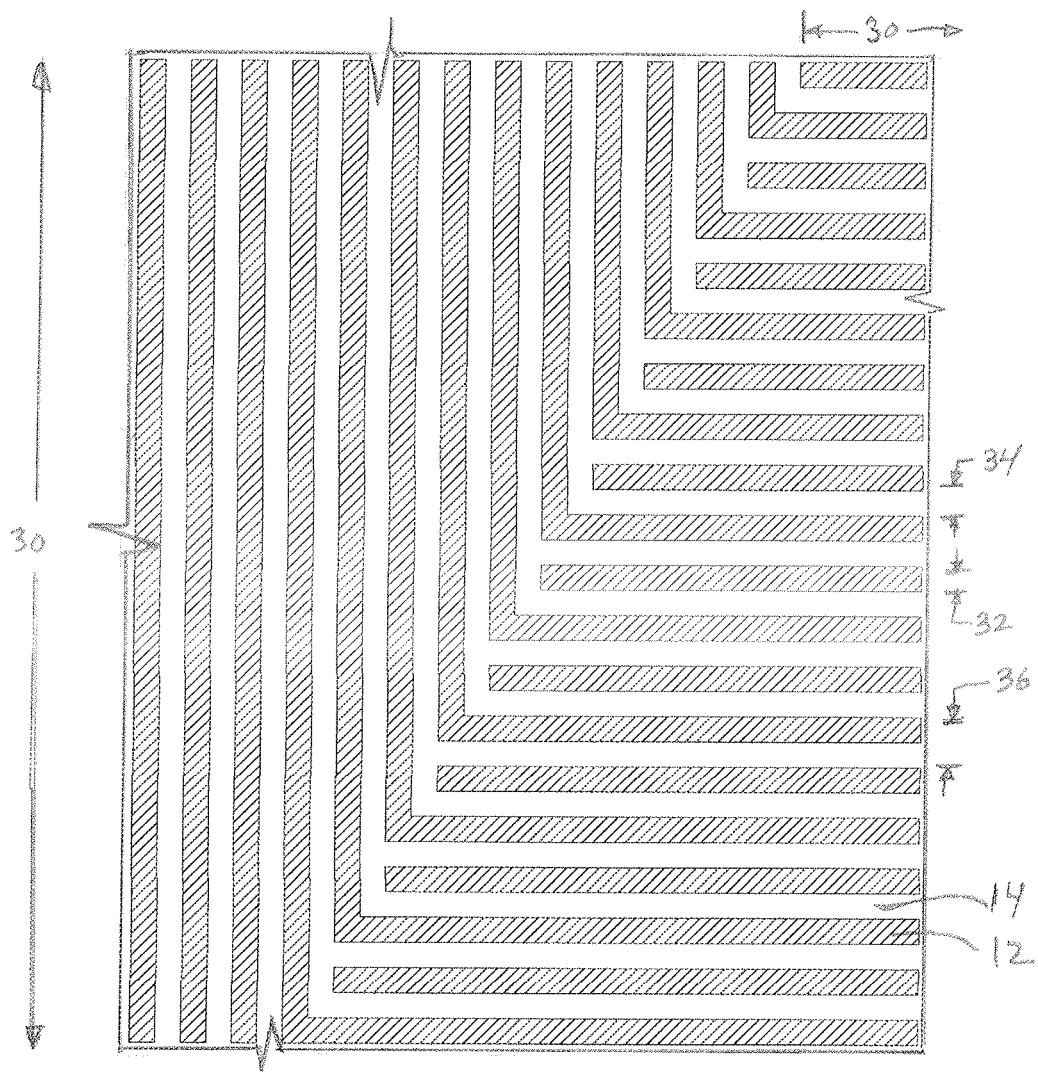
FIG. 1 shows part of a first flow field.

FIG. 1 shows a portion of a first flow field 10 for an electrochemical cell. The first flow field 10 could be used on the anode or cathode side of a cell. However, in the context of a water electrolysis cell used to produce hydrogen, the first flow field 10 is preferably used on the anode side of the cell. In this case, water flows into the first flow field 10 and oxygen and unreacted water flow out of the first flow field 10. The first flow field 10 typically occupies a portion of a flow field plate, which also provides one or more inlets and one or more outlets in communication with the first flow field 10. The flow field plate also provides a border around the first flow field 10. The border has seals or is adapted to cooperate in forming a seal with a membrane, such as a polymer electrolyte membrane or membrane electrode assembly, placed over the flow field plate. Typically, a diffusion layer is placed between the first flow field 10 and the membrane. The first flow field 10 is made by removing material from the flow field plate to provide channels 14. Material left between the channels 14 forms elongate ridges 12.

Figure 2:
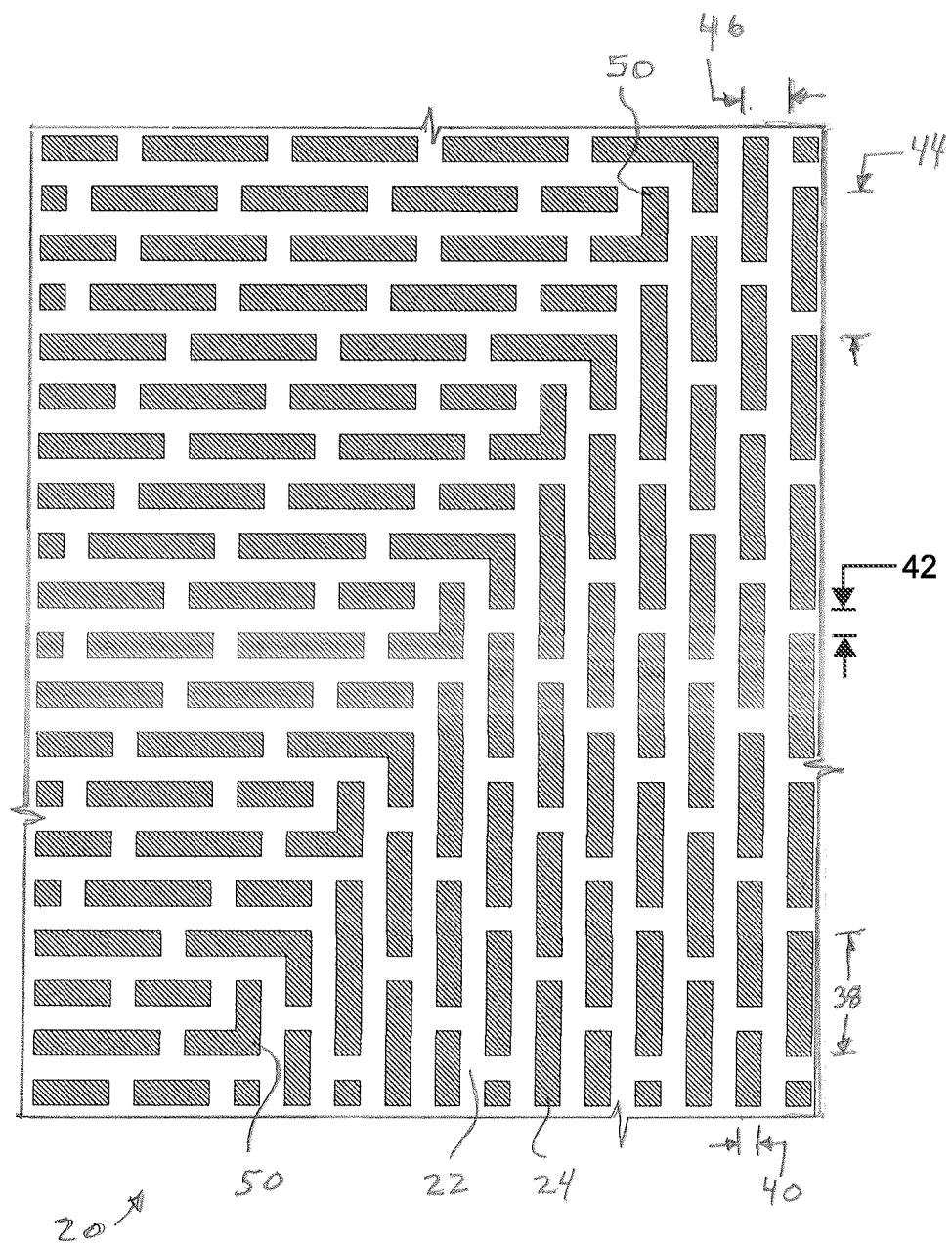
FIG. 2 shows part of a second flow field.

FIG. 2 shows a corresponding portion of a second flow field 20 for an electrochemical cell. The second flow field 20 could be used on the anode or cathode side of a cell. However, in the context of a water electrolysis cell used to produce hydrogen, the second flow field 20 is preferably used on the cathode side of the cell. In this case, hydrogen is produced into the second flow field 20. The second flow field 20 typically occupies a portion of a flow field plate, which also provides one or more outlets and optionally one or more inlets in communication with the second flow field 20. The flow field plate also provides a border around the second flow field 20 as described above. The second flow field 20 is made by removing material from the flow field plate to form a distal surface 22. Material remaining in the second flow field 20 forms short ridges 24.

In FIGS. 1 and 2, the flow fields 10, 20 extend beyond the break lines bordering the Figures. The break lines have been displaced from the actual boundary of the portion of the flow fields 10, 20 being shown to make the break lines more visible. Ridges 12 and short ridges 24 that are perpendicular to an adjacent break line extend continuously across the break line except in the case of some short ridges 24 that are already shown at their full length.

A flow field plate may contain only the first flow field 10 or only the second flow field 20. Alternatively, the first flow field 10 and the second flow field 20 may be provided on opposite sides of a single flow field plate to provide a bipolar plate. Rather than removing material from a plate, a flow field may be made by other methods, for example molding the flow field plate or building it up in layers.

To assemble an electrochemical cell, a flow field plate containing the first flow field 10 is attached to another flow field plate containing the second flow field 20 so that the first flow field 10 faces the second flow field 20. Optionally, each of the two flow field plates may be essentially identical bipolar plates. The flow field plates are typically separated with seals, a membrane, catalyst/electrode layers (which may be integral with the membrane) and diffusion layers.

Figure 3:
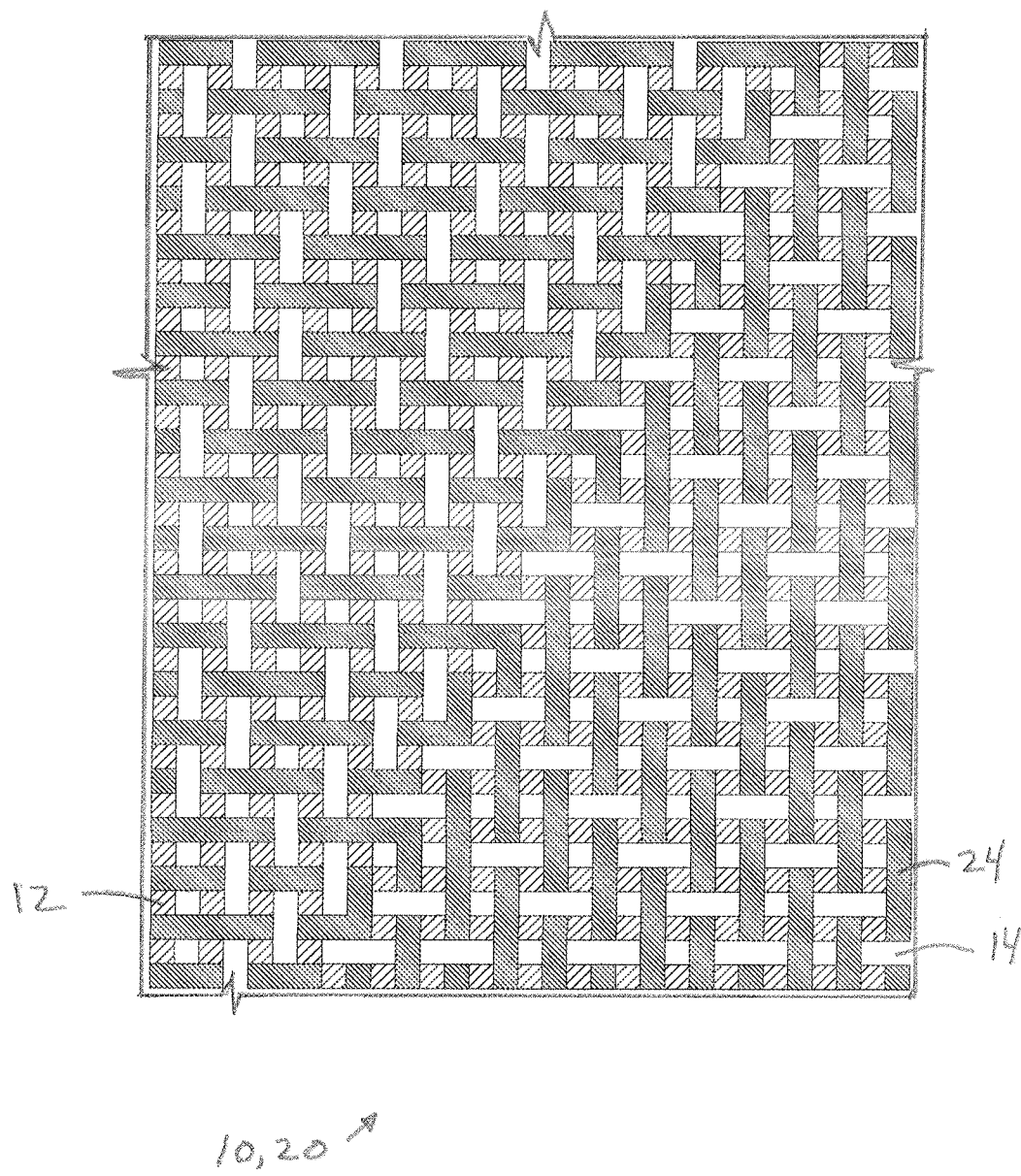
FIG. 3 shows the first and second flow fields positioned one over the other as in an electrochemical cell.

In FIGS. 1 and 2, the flow fields 10, 20 are oriented relative to each other as if they were part of an electrochemical cell that has been split open in a direction perpendicular to the flow fields 10, 20 but one of the flow fields 10, 20 is viewed directly while the other is viewed as if in a mirror. In FIG. 3, the flow fields 10, 20 are positioned relative to each other as they would be in an assembled cell with the second flow field 20 over top of the first flow field 10 but as if the distal surface 22 of the second flow field 20 removed to allow looking into the cell from above.

Referring to FIG. 1, the elongate ridges 12 have a length 30, which extends in at least one direction beyond the break lines, and width 32. Successive elongate ridges 12 are spaced apart by a first gap 34, which is also the width of channels 14. The distance from a point on one elongate ridge 12 to the same point on another elongate ridge 12 measured perpendicular to the elongate ridges 12 is perpendicular spacing 36. Perpendicular spacing 36 is also equal to the sum of the width 32 and the first gap 34.

Referring to FIG. 2, the short ridges 24 have length 38 and width 40. The short ridges 24 are separated, when measured perpendicular to the short ridges 24, by a second gap 42. The width 40 of the short ridges 24 is preferably the same as the width 32 of the elongate ridges 12. Further, the second gap 42 is preferably the same as the first gap 34. The spacing between a point on one short ridge 24 and the same point on a successive short ridge 24 is a perpendicular pitch 46 or a linear pitch 44 when measured perpendicular to the short ridges 24 or parallel to the short ridges 24 respectively. The linear pitch 44 is preferably essentially a whole number multiple of the perpendicular pitch 36, for example the linear pitch 44 may be 2, 3 or 4 times the perpendicular pitch 36. Preferable most, optionally 80% or more, of the short ridges 24 have the same length 38 and linear pitch 44.

The various dimensions described in the first two paragraphs above are preferably generally consistent across at least across most (50% or more), preferably 80% or more, of a flow field 10, 20, with the exception of the lengths 30 of the elongate ridges 12, which are variable.

Although there may be different patterns near inlets, outlets of borders, the area shown in FIG. 1 is representative of most, i.e. 50% or more, but optionally 80% or more, of the area of first flow field 10 in a cell. The channels 14 are configured to generally confine the flow of fluid across the first flow field 10 to distinct linear paths between an inlet and an outlet. Optionally, the channels may branch near the inlet and merge near the outlet. The elongate ridges 12 are called elongate because they typically extend continuously at least from one barrier (i.e. an edge of the flow field 10, branching or merger in the flow field 10, a change in direction in the flow field 10, an inlet, or an outlet) to another. At least some of the elongate ridges 12 may extend, optionally with one or more bends, across most of the straight-line distance between an inlet and an outlet of the flow field plate. The length of the elongate ridges 12 (which may include one or more bends) relative to the width of the channels 14, i.e. the first gap 34, is typically in a ratio of at least 10:1 or 20:1, and may for some elongate ridges be 50:1 or more.

The area shown in FIG. 2 is representative of most, i.e. 50% or more but optionally 80% or more, of the area of second flow field 20 in a cell. As for the first flow field 10, variations in the pattern, if any, are likely to occur near an inlet (if any), outlet or border. Further, only one bend in the elongate ridges 12, and corresponding rotation of the short ridges 24, is shown to simplify the illustration. However, a first flow field 10 may have multiple bends in the elongate ridges 12, optionally each with a corresponding rotation of the short ridges 24 in the second flow field 20.

The second flow field 20 is less directional, with shorter ridges and more potential mixing or other flow perpendicular to the ridges, than the first flow field 10. For example, the length of the short ridges 24 relative to the width of the channels 14 is typically less than 10:1, preferably 7:1 or less.

Some of the short ridges 24 may be parallel to a part of an elongate ridge 12. Where this occurs, the short ridge 24 preferably lies directly over the elongate ridge 12. Preferably, most of the short ridges 24 are oblique to one or more elongate ridges 12 ridges that it overlaps in an assembled cell. Most preferably, most, i.e. 50% or more but optionally 80% or more or essentially all, of the short ridges 24 overlap two or more elongate ridges 12 in an assembled cell and are oblique to those elongate ridges 12. The short ridges 24 may be at an angle of at least 30 degrees from the overlapping elongate ridges 12.

Preferably, the short ridges 24 are at right angles to the overlapping elongate ridges 12. In this case, the length of the short ridges 24 is preferably essentially the same as the sum of (a) a whole number multiple of the width 32 of the elongate ridges 12 added to (b) the first gap 34.

As shown in FIG. 2, the short ridges 24 form a set of parallel, segmented lines. In successive lines, the short ridges 24 are offset from each other, for example such that second gaps 42 between short ridges 24 in one line are located across from short ridges 24 in adjacent lines. As shown in FIG. 3, successive short ridges 24 overlapping the same elongate ridge 12 in an assembled cell preferably overlap different sets of elongate ridges 12. The short ridges 24 preferably change their orientation so that this configuration is preserved around bends in the elongate ridges 12. Irregular ridges 50 may be provided in the second flow field 20 at bends in the elongate ridges to help mesh the pattern of short ridges 24 on either side of such a bend. Bends and ends of elongate ridges 12 and short ridges 24 are preferably rounded to decrease turbulence in the flow fields 10, 20

A method for designing the flow fields 10, 20 starts by designing the first flow field 10. The design of the first flow field 10 provides channels 14 between an inlet and outlet of the first flow field 10. The second flow field 20 is then designed with reference to the first flow field 10. In a first step, notional elongate ridges, or boundary lines that would contain the short ridges, are laid out perpendicularly to elongate ridges of the first flow field, on top of ridges in the flow field, or in a combination of these positions, but preferably mostly perpendicularly. The notional ridges or boundary lines in the second flow field are then broken into short ridges 24.

Where the short ridges 24 are perpendicular to elongate ridges 12, the notional ridges or boundary lines are preferably broken up according to a consistent pattern that is offset between successive notional ridges or boundary lines. In a preferred embodiment, each short ridge 24 extends from one side of an elongate ridge 12 to the opposite side of at least one adjacent elongate ridge 12, successive short ridges 24 in a line are separated by the first gap 34, and short ridges 24 in successive lines are offset by a distance equal to the first gap 34 added to the width 32 of the elongate ridges 12 or more. In the particular example shown, the width of 32 of the elongate ridges 12 is essentially the same as the first gap 34, the pattern involves creating short ridges 24 having length 38 usually (i.e. except near bends or other barriers) equal to five times the width 32 of the elongate ridges 12, the gap 42 is essentially equal to the width 40, and the offset is equal to twice the width 32 of the elongate ridges. Preferably, where the direction of the short ridges 24 changes, at least some irregular ridges 50 are added. Since the second flow field is generally non-directional, an outlet, or inlet if any, may be located within or in communication with any side of the second flow field.

The word "essentially" when used herein indicates that two parameters differ by no more than 10% from each other. The word "preferably" when used herein indicates that a feature is optional but preferred.

We claim:

1. A set of flow field plates for an electrochemical cell comprising,
    a first flow field plate having a first flow field comprising a plurality of elongate ridges, and
    a second flow field plate having a second flow field comprising a plurality of second ridges forming a set of parallel segmented lines,
    wherein each of the parallel segmented lines comprises the plurality of second ridges separated by a plurality of second gaps in line with the second ridges; and,
    wherein, when the flow field plates are assembled into a cell, the second ridges span between at least two successive elongate ridges.

2. The set of claim 1 wherein the elongate ridges are at least 10 times as long as an average gap between successive elongate ridges, the gap measured perpendicular to the elongate ridges.

3. The set of claim 1 wherein the second ridges are less than 10 times as long as an average gap between successive elongate ridges, the gap measured perpendicular to the elongate ridges.

4. The set of claim 1 wherein the second ridges are oblique to the elongate ridges.

5. The set of claim 1 wherein the second ridges are normal to the elongate ridges.

6. The set of claim 1 wherein the spacing between successive second ridges in a line is essentially the same as two to four times the spacing between successive elongate ridges measured perpendicular to the elongate ridges.

7. The set of claim 1 wherein the elongate ridges and the second ridges have essentially the same width.

8. The set of claim 1 wherein the gap between successive second ridges measured perpendicular to the second ridges is essentially the same as the gap between successive elongate ridges measured perpendicular to the elongate ridges.

9. The set of claim 1 wherein the second ridges have a length essentially equal to two to four times the average thickness of the elongate ridges added to the average gap between successive elongate ridges measured perpendicular to the elongate ridges.

10. The set of claim 1 wherein the second gaps in the segmented lines are located across from the second ridges in adjacent segmented lines.

11. The set of claim 1 wherein the first flow field is an anode flow field or a cathode flow field.

12. The set of claim 1 wherein the second flow field is an anode flow field or a cathode flow field.

13. The set of claim 1 wherein when the flow field plates are assembled into a cell, the elongate ridges of the first flow field plate face the second ridges of the second flow field plate.

14. The set of claim 1 wherein when the flow field plates are assembled into a cell, the first flow field plate and the second flow field plate are separated by a membrane.

15. The set of claim 1 wherein when the flow field plates are assembled into a cell, the first flow field carries a liquid and the second flow field carries a gas.

16. The set of claim 1 wherein when the set of parallel segmented lines occupies 50% or more of the area of the second flow field.

* * * * *